United States Patent [19]

Strohm

[11] Patent Number: 4,699,220
[45] Date of Patent: Oct. 13, 1987

[54] ROW CROP AERATOR

[75] Inventor: Michael W. Strohm, West Union, Ill.

[73] Assignee: Strohm Brothers, Inc., Chicago, Ill.

[21] Appl. No.: 708,046

[22] Filed: Mar. 4, 1985

[51] Int. Cl.$^4$ .................. A01B 13/08; A01B 39/12
[52] U.S. Cl. .................................. 172/166; 172/700
[58] Field of Search ............ 172/166, 180, 699, 196,
172/700, 773, 762, 739, 740, 763; 111/7

[56] References Cited

U.S. PATENT DOCUMENTS

| | | | |
|---|---|---|---|
| 184,171 | 11/1876 | Porter | 172/700 |
| 2,595,353 | 5/1952 | Graham | 172/730 |
| 2,906,353 | 9/1959 | Rogers | 172/166 X |
| 3,188,988 | 6/1965 | Peck | 111/7 |
| 3,912,019 | 10/1975 | Baughman | 172/180 |
| 4,106,568 | 8/1978 | Cline | 172/327 |
| 4,243,104 | 1/1981 | Sipos | 172/196 |
| 4,245,706 | 1/1981 | Dietrich, Sr. | 172/700 |
| 4,403,662 | 9/1983 | Dietrich | 172/196 |
| 4,415,042 | 11/1983 | Cosson | 172/762 |

FOREIGN PATENT DOCUMENTS

| | | | |
|---|---|---|---|
| 557839 | of 1958 | Canada | 172/700 |
| 2031252 | 4/1980 | United Kingdom | 172/700 |
| 1595784 | 8/1981 | United Kingdom | 172/700 |

OTHER PUBLICATIONS

Farm Show, vol. 10, No. 1, p. 3, 1986, received 3-5-86.
Farm Show, p. 4, Different Type Sub-Mulcher, received 12/16/85.
Orthman Parabolic Precision Ripper, advertizing brochure of Orthman, Lexington, Neb. 10/1981.
Corsicana Pasture Renovator, advertizing brochure of Corsicana Grader and Machine Co., Corsicana, TX, 1/1980.
Power Farming, pp. 62, 63, Sep. 1986, Spaldings Flatlift Sub-Surface Cultivator.

Primary Examiner—Richard J. Johnson
Attorney, Agent, or Firm—Mason, Kolehmainen, Rathburn & Wyss

[57] ABSTRACT

A soil aeration machine with a straight main frame being attached to a tractor via a three-point hitch. The main frame carries standards to which deep tillage knives are attached. A coulter is mounted directly in front of each knife to cut through the residue left on the surface, thus preventing build-up of residue on the knife. The knives have wings arranged so that when the knives penetrate deep into the soil, the wings slice through and lift the soil, creating macropores in the soil. As this lifting action occurs, no soil is displaced or turned, thus leaving all residue undisturbed on the surface.

15 Claims, 8 Drawing Figures

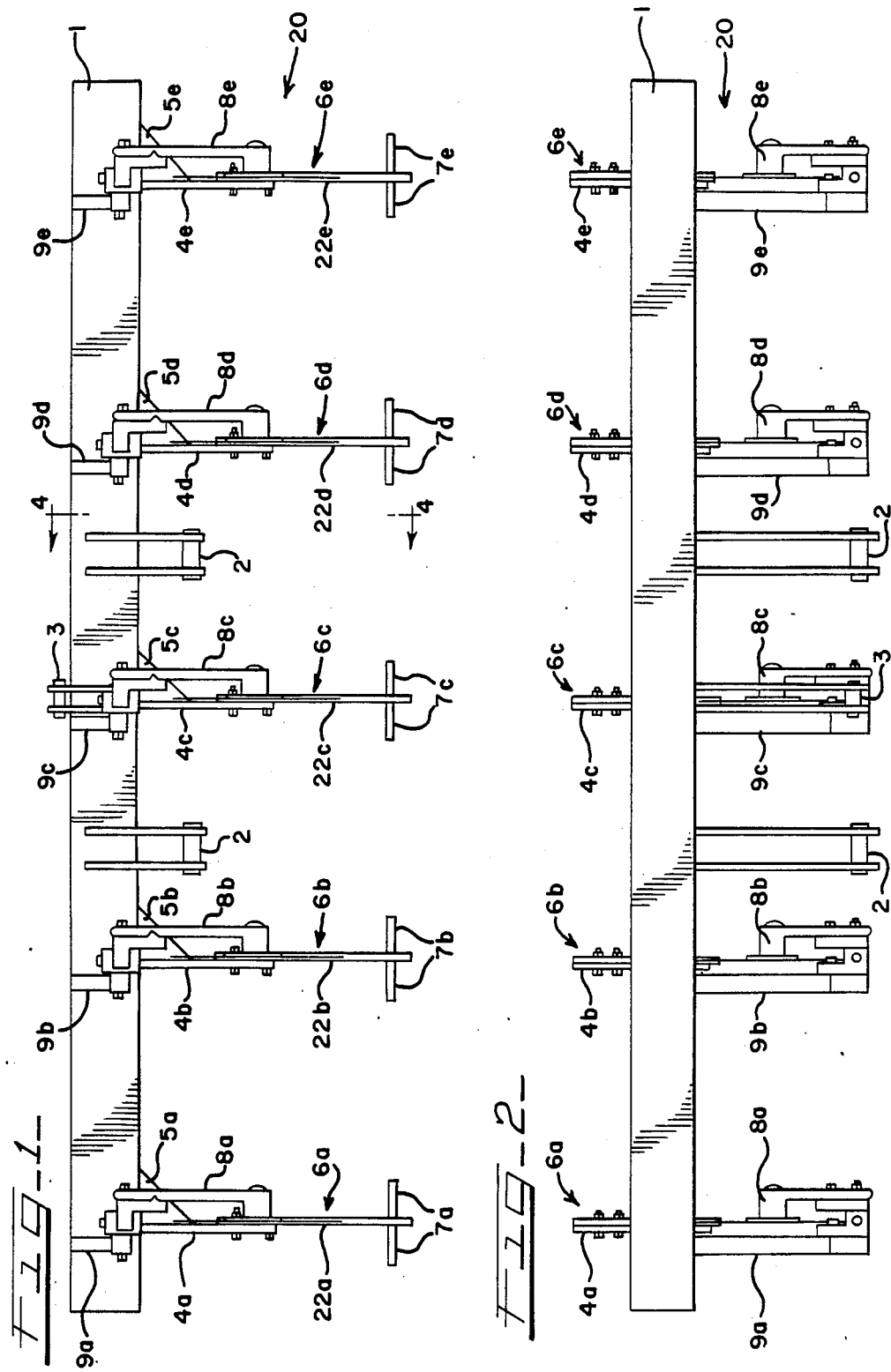

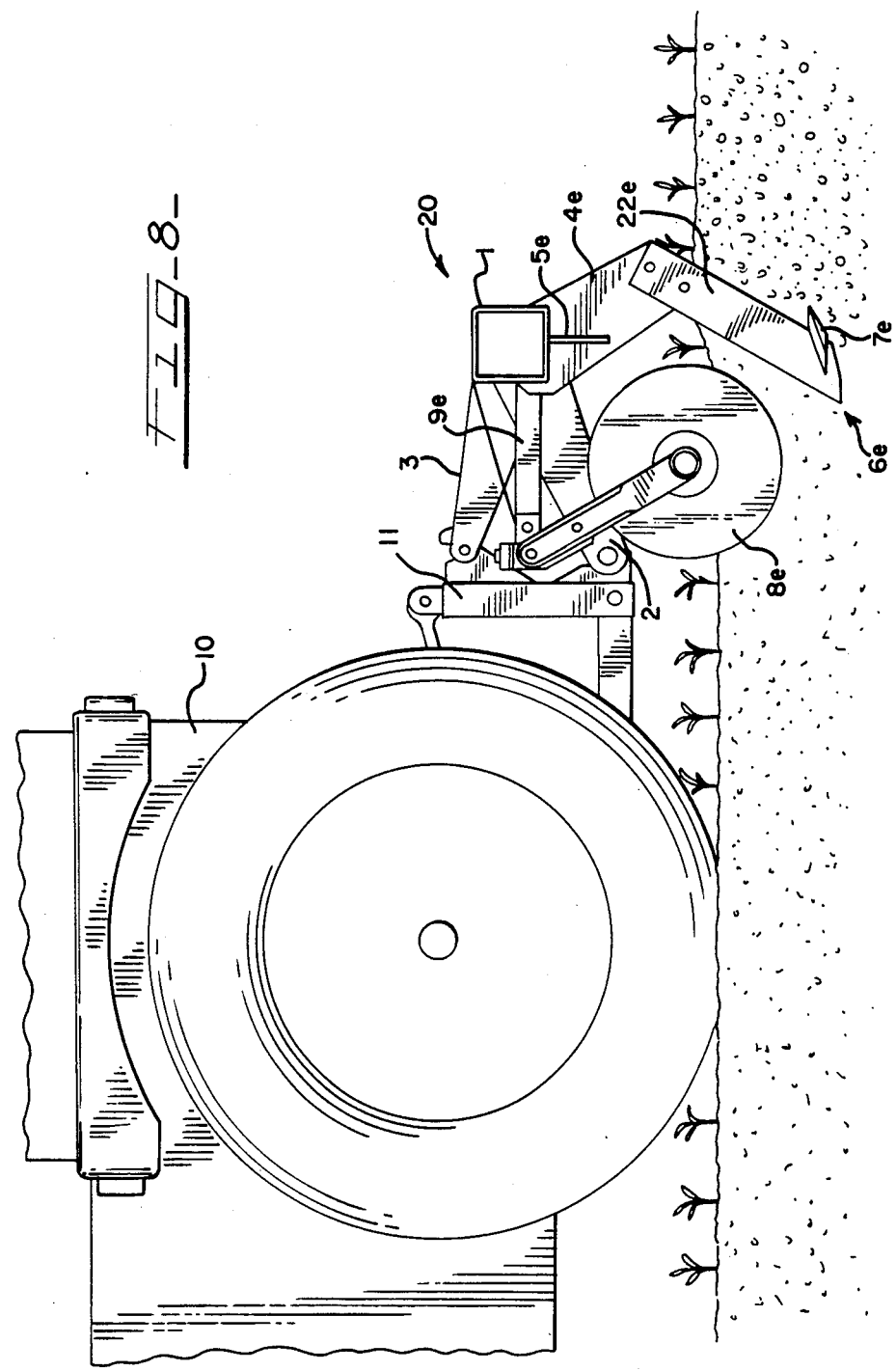

ROW CROP AERATOR

BACKGROUND OF THE INVENTION

1. Field of the Invention

This invention relates to apparatus for agricultural tillage. The no-till row crop aerator is designed to be towed behind an agricultural tractor through established growing crops. Unlike conventional subsoil tilling machines, this invention's unique soil lifting action creates macrapores in the soil the entire width of the invention under the growing plants, causing increased aeration of the soil, with minimal soil surface disturbance.

2. Description of the Related Art

The conventional methods used in agriculture today consist of mainly three types of soil-working tools, i.e., the moldboard plow, the disc, and a variety of subsoil looseners.

Perhaps the most commonly used tool for plowing is the conventional moldboard plow. The plow bottom is typically set at a particular depth of plowing, for example, eight or ten inches. These plows are mounted to a main beam which is inclined relative to the direction of travel of a tractor so that each moldboard is set to take a strip of land, cut it, and roll the ground over into a furrow formed by the next forward moldboard. The leading moldboard turns its strip of ground over into a furrow formed on a previous pass of the plow system.

In the case where moldboard plows are used to till soil which has large amounts of trash (i.e., crop residue which, in the case of corn, may be bulky and tough) on the surface, a coulter may be located in front of each moldboard plow to cut through the trash and at least partially through the soil. This prevents a build-up of trash on the leading edges of the moldboard and further assists the moldboard in cutting the soil. Coulters are also used in connection with other tillage systems and are generally found in the form of a relatively flat, circular blade.

When a moldboard plow is used repeatedly to plow ground at the same depth, a layer of highly compacted soil is formed just beneath that depth. This is called the hard pan or plow sole. Furthermore, a moldboard plow displaces to one side all of the soil it has tilled. Eventually, the ground must be plowed in the opposite direction, and when this occurs, a deep side ridge normally is left at the end swath.

Another form of blade used in tillage systems is referred to as a "disc", which takes the shape of a dish or bowl. The edge of the disc blade is used to cut trash, while the concave surface of the blade is used to throw some of the top soil to the side. Typically, a plurality of disc blades are arranged at a relatively close spacing and mounted on a common shaft which extends at an acute angle relative to a line transverse of the direction of travel of the tractor. When a gang of disc blades is pulled across a field, complete coverage is obtained. That is, all of the soil is tilled, the trash is cut up and mixed with top soil, while some trash is buried. Complete coverage is obtained because the spacing of adjacent discs is typically about forty percent of the diameter of the disc, and the discs are turned slightly to work a path. In these devices, to reduce the effect of lateral soil displacement, a second line or gang of discs, facing the other direction, may be placed behind the first line. The effect of the disc blades is to work all of the soil, rather than selected strips. The disc is generally used in conjunction with the moldboard plow to prepare an appropriate seedbed for planting.

A major disadvantage of repeated use of the disc and plow is the formation of the hard pan or plow sole. Plant roots have difficulty penetrating the hard pan, thereby denying the plant access to extra nutrients and water. In addition, water has a tendency to drain over the hard pan, instead of being absorbed into the subsoils, thus resulting in increased water saturation of the topsoil. The drying process of the topsoil is delayed by this saturation, as the drying must be accomplished by evaporation of moisture from the surface instead of drainage deeper into the subsoil. The increased saturation of the topsoil delays the farmer's access to his fields. This causes the farmer's planting to be delayed, thereby generally resulting in a reduction of crop yields due to the shorter available growing period.

The subsoil loosening tools consist mainly of a series of parabolic shanks attached to a main frame. These shanks, which have hardened tips on the ends because of very high friction rates and excessive wear, work at depths of ten to twenty inches breaking through the hard pan or plow soles created by the moldboard plow or disc. The use of this tool is limited to fall tillage because of its working action of the soil. The ground surface is usually left very uneven due to the churning action caused by the wide frontal area of the shanks. The soil must be reworked in the spring with a disc or comparable soil working tool to prepare the soil for planting.

The main disadvantage associated with the aforementioned tillage methods is the inability to control erosion. When strips of land are rolled over by the moldboard plow or worked by the disc, there is very little trash left on the surface to absorb the impact of rainfall. When the soil, and not the trash, absorbs the great forces generated by rainfall, the soil is loosened and put into a liquid suspension, resulting in great soil erosion.

Another disadvantage associated with the aforementioned tillage methods is the high cost incurred in tilling the soil. In such cases, very large traction forces are necessary to force the soil working tools into the soil in order to obtain the required depth of penetration. Furthermore, the plowing, discing and planting of the soil are generally carried out in separate processes, thereby resulting in increased variable costs of production (i.e., diesel fuel, etc.) as well as fixed costs caused by shorter life span of equipment due to increased wear and tear.

As a result of the aforementioned disadvantages of conventional methods of agricultural tillage, an agricultural tillage system known as no-till or slot planting has evolved and is being used by an increasing number of farmers. In this method of crop production, crops are planted directly into crop residue without plowing or discing. No-till planting was made possible by the revision of existing planters, allowing them to plant seeds directly into the residue left by the previous year's crop. The planter consists of a double disc arrangment operating at approximately 1½ inches in depth, creating a V-shaped slot in the soil surface. The seed is dropped into the slot, which is closed by two press wheels forcing the walls of the slot to collapse, thereby covering the seed and assuring good soil-to-seed contact for germination. Coulters, which are used on no-till planters to control the trash, are mounted directly in front of the double disc openers and operate at the same depth. The coulters cut through the trash, keeping the planter units from riding over the trash and leaving the seed on top of the trash, and not in the soil.

The main advantage associated with no-till planting is the ability to control soil erosion. By no-till planting, higher levels of residue are left on the surface, thereby helping to absorb the force of rainfall, thus decreasing soil erosion. In addition, more water can be absorbed into the subsoils, which water can then be used as reserves in the hot, dry growing months of summer. The highest rates of transpiration and evaporation occur during the summer months. If rainfall is minimal and roots cannot grow past the hard pan to reach water reserves, then the plants suffer, resulting in reduced yields.

No-till planting also results in lower costs and time savings. Because there is no requirement of multiple trips across the field to conduct different tillage processes, the cost of raising no-till crops is less than conventional methods. Another advantage of no-till planting is the increased proliferation of microbial life. By not shocking the soil with the use of discs or plows, microbial life flourishes.

The main disadvantage associated with no-till planting is that the crop yields are generally less than those yields associated with conventional tillage methods. The main reason for the decreased yields is that the soil transversed by no-till planting is less aerated than soil transversed by conventional tillage methods. As roots need oxygen for maximum growth to occur, the reduced amount of oxygen in the soil will result in reduced yields.

Examples of conventional agricultural tillage methods are described in the following patents

| Patent Number | Patent Date | Patentees |
|---|---|---|
| 4,106,568 | August 15, 1978 | Cline |
| 4,243,104 | January 6, 1981 | Sipos, Varga and Hali |
| 4,245,706 | January 20, 1981 | Dietrich |
| 4,403,662 | September 13, 1983 | Dietrich |

SUMMARY OF THE INVENTION

In brief, in accordance with the present invention, there is provided a deep tillage knife assembly for lifting and aerating soil through which the knife assembly is pulled in a forward direction along the soil surface. The knife assembly includes a vertical knife blade having a leading edge, a trailing edge, an upper end and a lower end extending from the leading edge to the trailing edge. The leading edge projects along a generally straight line downward and forward below the soil surface at a blade angle of about 30 degrees. Part of the bottom end of the knife blade slopes rearward and upward. A pair of generally symmetrical wings extend laterally from the knife blade. Each wing includes upper and lower surfaces and a forward edge defined generally by the intersection of the upper and lower surfaces. The upper surfaces include generally parallelogram shaped lifting surfaces sloping rearward and upward from said forward edge at a lift angle not greater than about 15 degrees for imparting a lifting force to fracture the soil above the wings while maintaining the location of the soil. The forward edges of the wings extend horizontally outward from the knife blade and slope rearwardly at a wing angle at least as large as the blade angle. The lower surfaces each include a landside generally parallel to the soil surface for absorbing downward force resulting from reaction of the upper surfaces against the soil. An agricultural implement in accordance with the invention includes a number of the knife assemblies supported by a frame adapted to be pulled behind a plow.

In use, the no-till row crop aerator is an agricultural tillage instrument designed to increase crop yields by increased aeration of the soil with minimal soil surface disturbance, thus reducing soil erosion. The invention is pulled by a tractor at speeds of four to six miles per hour through established growing corn of two to six inches in height, with deep tillage knives penetrating the soil at depths of twelve to sixteen inches. The knives are spaced to run in the middle of the crop rows, thus causing no damage to the growing crop. In addition, as this invention is used on a crop in its infancy, there is no chance of damaging the crop's root system. The wings which are mounted approximately two inches above the tip of each deep tillage knife, lift and fracture the soil the entire width of the invention between and under the growing plants.

The main advantage of the use of the invention is the increased aeration of the soil. The unique lifting action of the invention bends and breaks the soil, creating macropores in the soil structure and leaving the soil in a crumbly state with minimal disturbance of surface residue. This lifting action distinguishes the invention from the one pass complete tillage systems, which lack this ability. The aeration of the soil promotes bacterial proliferation which breaks down organic matter into humus which is rich in nutrients in an exchangable form to aid in crop growth.

While conventional methods of agricultural tillage (i.e., plow and disc) do aerate the soil, the invention is designed to eliminate the disadvantages associated with such methods. By penetrating the soil at the aforementioned depths, the invention greatly aids in breaking up the hard pan caused by the conventional methods of farming, thus allowing roots to grow deeper to seek needed nutrients and water. By breaking up the hard pan, plant roots, which previously would not penetrate the hard pan, now grow deeper into the subsoil which has added reserves of water and nutrients. As plant roots can now grow deeper to reach these needed nutrients, the plant is less likely to be stressed in dry weather due to lack of moisture.

The invention has the added advantage of reducing soil erosion. The invention lifts the fractured soil approximately two to four inches, settling it back into its original location without being turned or mixed. Any residue or trash on the surface is left practically undisturbed by the use of the invention. By loosening the soil, but not disturbing the crop residue on the surface, the invention keeps erosion within acceptable limits while at the same time allowing the rain water to reach deeper penetration of the soil. The residue left on the surface absorbs the shock of rainfall, and slows the water runoff, thus keeping the top soil in place.

The implementation of this invention into a no-till farming operation will eliminate the need for all other types of tillage equipment, such as the plow, disc and subsoilers, thus eliminating the soil compaction problems. In addition, reducing the frequency of trips across the soil with conventional tillage of tools will reduce the farmer's expenses and will cause the soil to remain open, promoting better drainage and allowing the farmer earlier access to the fields in the planting season.

Another unique aspect of the invention is that it is designed to be used after the planting of the crop, while the crop is still in its infancy. A small amount of compaction is created by the planting process and can be detrimental to crop growth. Use of the invention corrects the compaction and leaves the soil in the most desirable state for maximum growth and yield potential. In contrast, subsoil looseners can be used only after a crop is harvested in the fall. The rainfall during the fall and winter months causes the soil to silt back together, thus reducing the aeration caused by the subsoiling operation. The aeration created by the use of the invention, on the other hand, remains for two to four months after use, the time of maximum plant growth. Furthermore, use of the invention after planting enables the farmer to forego other preplanting tillage systems, thus allowing the farmer to plant the crop sooner, and thereby offering the crop the maximum growing time available.

The invention is not to be mistaken for a tool known as a cultivator. While the cultivator is designed to be used on growing crops, its only purpose is for weed control. The cultivator, which is pulled by a tractor over a growing crop, has shallow tillage sweeps mounted between the rows. These sweeps operate at depths of only one to three inches, clipping weed roots and churning the top one to three inches of soil.

Tests conducted by the inventor indicate that crop yields were significantly increased with the use of the invention. Yields of no-till corn crops tilled with the invention exceeded yields of corn crops raised in control plots by approximately 33%. In addition, the use of the invention in conventional planting systems was found to increase yields by 5% to 7%. This increase in yields was mainly due to the reduction in compaction of soil, as the aeration of the soil was largely completed by the conventional methods of tillage.

BRIEF DESCRIPTION OF THE DRAWINGS

FIG. 1 is a frontal view of an agricultural implement embodying the the invention.

FIG. 2 is a top view of FIG. 1.

FIG. 8 is a side view of the implement attached to the rear of a tractor, which is shown in fragmentary form, illustrating the invention being pulled through the soil within a growing crop of corn.

DESCRIPTION OF THE PREFERRED EMBODIMENTS

Figure 3:
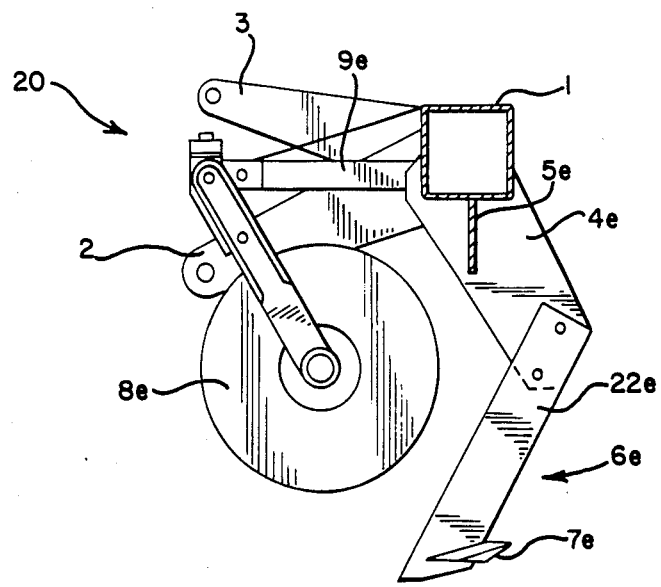
FIG. 3 is an end view of the implement.

In FIGS. 1-4 and 8 of the drawings there is illustrated an agricultural implement generally designated as 20 and constructed in accordance with the principles of the present invention. The implement 20 includes a frame 1 below which are supported a plurality of knife assemblies 6. In the illustrated embodiment there are five assemblies 6 individually designated as 6a through 6e. In FIGS. 1-4 and 8 of the drawings, letters a-e are used in a similar manner with corresponding reference numbers to designate structure associated with specific knife assemblies.

Referring to FIG. 1 and FIG. 2, the main frame 1 of the invention consists of a square hollow beam having a longitudinal center line perpendicular to the direction of travel. It is attached to a tractor via a three-point hitch through hitch plates 2 and 3, welded perpendicular to the main frame. The hitch 2, 3, which is known as a category III hitch, projects forward in order to provide clearance for the coulter assemblies 8.

Figure 4:
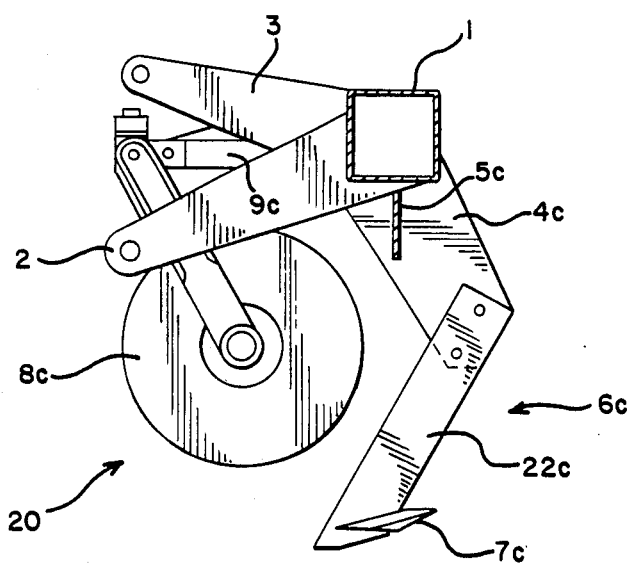
FIG. 4 is a sectional view taken along line 4—4 of FIG. 1 showing the mounting points which attach to the tractor.

Referring to FIG. 3 and FIG. 4, there are a row of standards (4) which project below the main frame 1. These are welded and project backward at an approximate angle of 30° relative to perpendicular. Gussets 5 are welded to the main frame 1 and the knife standard 4. The knives 6 are mounted to the standards 4 via two $\frac{5}{8}''$ bolts and project forward at an angle relative to perpendicular of approximately 30°. The top bolt is a soft shear bolt which will shear in case of hitting an immovable object in the soil thereby preventing any extensive damage to the standards 4 or the main frame 1. The lower bolt is of grade 5 quality and acts as a pivot in case of the top bolt shearing, allowing the knife to swing upward and backward.

Referring to FIG. 3 and FIG. 4, the coulter assemblies 8 are mounted on the main frame 1 by mounts 9 projecting forward from the main frame 1. The mounts 9 are braced by a strap welded to the top leading edge of the main frame 1 and running forward and intersecting the top edge of the coulter mount 9 75% of its length from the main frame 1. The coulters 8 are flat round discs that run at depths adjustable from 2 to 8 inches directly in front of the knives 6. In no-till systems there are large amounts of trash on the surface of the ground. The coulters roll and slice through the trash and the soil at the predescribed depths, thus preventing the residue from clogging or building up on the knife assemblies 6. By slicing into the soil, the coulters also reduce the amount of power required to pull this tool.

Figure 5:
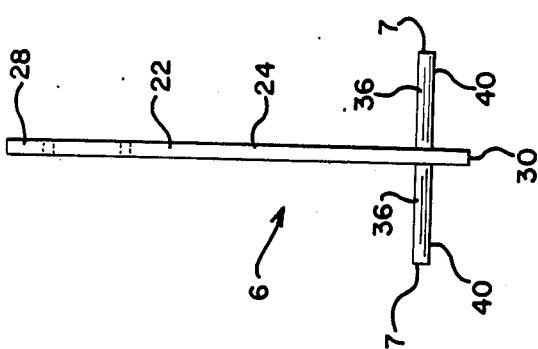
FIG. 5 is a frontal view of one of the knife assemblies of the implement of FIG. 1.
Figure 6:
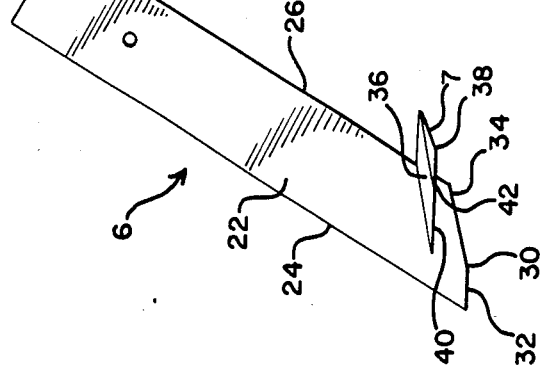
FIG. 6 is a side view of the knife assembly.
Figure 7:
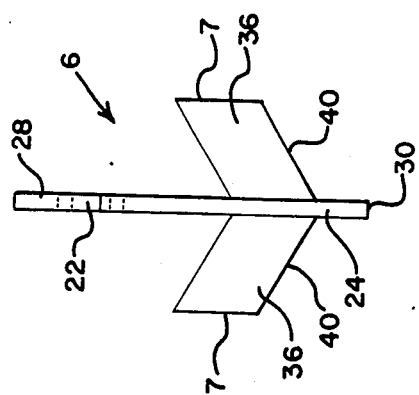
FIG. 7 is a top view of the knife assembly.

Each knife assembly 6 includes both a generally vertical knife blade 22 and a pair of wings 7. One of the assemblies 6 is illustrated in more detail in FIGS. 5-7. Blade 22 includes a leading edge 24, a trailing edge 26, an upper end 28 attached to one of the standards 4 and a lower end 30. The leading edge 24 extends in a straight line down and forward at an angle of 30 degrees. Lower end 30 of blade 22 includes a forward portion 32 parallel to the soil surface and a rear portion 34 sloping up and to the rear. A pair of symmetrical wings 7 are attached to the opposite sides of the blade 22 and extend laterally to each side near and spaced above the lower end 30. Each wing 7 has an upper surface 36 and a lower surface 38 intersecting at a forward edge 40. Upper surfaces 36 are generally parallelogram shaped and slope rearward and upward at a lift angle of 10 degrees. Forward edges 40 extend in a horizontal plane or parallel to the soil surface and slope rearward at an angle of 30 degrees. Lower surfaces 38 include a landside or horizontal surface 42 parallel to the soil surface. In use, after leading edge of the wing 7 shears the soil, it lifts it in a manner to break the soil creating air pockets all the way to the surface. The surface under the leading edge of the wing 7 is flat, which is known as a landside and then projects back up to the trailing edge of the wing. This landside absorbs much of the pressure exerted downward by the wing's 7 lifting action of the soil.

Referring to FIG. 8, the implement 20 is attached to a tractor 10 via a quicktach hitch 11. The purpose of this drawing is to demonstrate the action of the invention and the difference in the soil structure before and after operation. The soil is highly compacted before aeration. As the invention is pulled through this highly compacted soil, it lifts and bends the soil over the knives, leaving a very porous structure which promotes maximum root growth because of oxygen introduction into the profile. Rainfall is also more readily absorbed into the porous structure instead of running off the surface soil and causing erosion. By creating this type of environment, maximum crop growth can be achieved, thereby enabling the farmer to realize maximum profit.

I claim:

1. A deep tillage knife assembly for lifting and aerating soil through which the knife assembly is pulled in a forward direction along the soil surface, said knife assembly comprising:
   a vertical knife blade having a leading edge, a trailing edge, an upper end and a lower end extending from said leading edge to said trailing edge;
   said leading edge projecting along a generally straight line downward and forward below the soil surface at a blade angle of approximately 30 degrees relative to a line perpendicular to the soil surface;
   at least a portion of said bottom end of said knife blade sloping rearward and upward relative to the soil surface;
   a pair of generally symmetrical wings attached to opposite sides of said vertical knife blade near said bottom end and extending laterally from said vertical knife blade;
   each said wing including upper and lower surfaces and a forward edge defined generally by the intersection of said upper and lower surfaces;
   said upper surfaces including generally parallelogram shaped lifting surfaces sloping rearward and upward from said forward edge at a lift angle not greater than approximately 15 degrees for imparting a lifting force to fracture the soil above the wings while maintaining the location of the soil;
   said forward edges of said wings extending laterally outward from said knife blade substantially parallel to the soil surface and sloping rearwardly at a wing angle at least approximately as large as said blade angle; and
   said lower surfaces each including a landside generally parallel to the soil surface for absorbing downward force resulting from reaction of said upper surfaces against the soil.

2. A deep tillage knife assembly as claimed in claim 1 wherein said blade angle is 30 degrees.

3. A deep tillage knife assembly as claimed in claim 1 wherein said wing angle is approximately equal to said blade angle.

4. A deep tillage knife assembly as claimed in claim 1 wherein said lift angle is approximately 10 degrees.

5. A deep tillage knife assembly as claimed in claim 4 wherein said lift angle is 10 degrees.

6. A deep tillage knife assembly as claimed in claim 1 wherein said lower end of said knife blade extends below said wings.

7. A deep tillage knife assembly as claimed in claim 6 wherein said bottom end of said knife blade includes a forward portion generally parallel to said soil surface and a rearward portion sloping rearward and upward.

8. An agricultural implement for subsoil tillage of soil across which the implement is drawn in a forward direction, said implement comprising in combination:
   a frame having a predetermined width across the direction of implement movement;
   knife support means connected to said frame;
   a plurality of knife assemblies carried by said knife support means at laterally spaced positions along the width of said frame;
   each of said knife assemblies including a vertical knife blade having a leading edge, a trailing edge, an upper end and a lower end extending from said leading edge to said trailing edge;
   said upper ends of said blades being fixed to said knife support means;
   said leading edges of said blades projecting parallel to one another along generally straight lines downward and forward below the soil surface to a blade depth at a blade angle of approximately 30 degrees relative to a line perpendicular to the soil surface;
   at least a portion of said bottom ends of said knife blades sloping rearward and upward relative to the soil surface;
   a pair of generally symmetrical wings attached to opposite sides of each knife blade near said bottom end and extending laterally from said knife blade;
   each said wing including upper and lower surfaces and a forward edge defined generally by the intersection of said upper and lower surface;
   said upper surfaces including generally parallelogram shaped lifting surfaces sloping rearward and upward from said forward edge at a lift angle not greater than approximately 15 degrees for imparting a lifting force to fracture the soil above the wings while maintaining the location of the soil;
   said forward edges of said wings extending laterally outward from said knife blade substantially parallel to the soil surface and sloping rearwardly at a wing angle at least approximately as large as said blade angle; and
   said lower surfaces each including a landside generally parallel to the soil surface for absorbing downward force resulting from reaction of said upper surfaces against the soil.

9. An agricultural implement as claimed in claim 8, further comprising coulter support means connected to said frame and a plurality of coulters carried by said coulter support means, one of said coulters being positioned in front of each of said knife assemblies.

10. An agricultural implement as claimed in claim 9 wherein said coulters extend into the soil to a coulter depth less than said blade depth.

11. An agricultural implement as claimed in claim 10 wherein said coulter depth is approximately between 20 and 50 percent of said blade depth.

12. An agricultural implement as claimed in claim 8, said knife support means comprising a plurality of knife standards projecting downward and rearward from said frame.

13. An agricultural implement as claimed in claim 8 wherein said wing angle is approximately equal to said blade angle.

14. An agricultural implement as claimed in claim 8 wherein said lift angle is approximately 10 degrees.

15. An agricultural implement as claimed in claim 8 wherein said lower ends of said knife blades extend below said wings.

* * * * *